(12) United States Patent
Bober et al.

(10) Patent No.: US 8,660,385 B2
(45) Date of Patent: Feb. 25, 2014

(54) FEATURE-BASED SIGNATURES FOR IMAGE IDENTIFICATION

(75) Inventors: Miroslaw Bober, Guildford (GB); Paul Brasnett, Surbiton (GB)

(73) Assignee: Mitsubishi Electric Corporation, Tokyo (JP)

( * ) Notice: Subject to any disclaimer, the term of this patent is extended or adjusted under 35 U.S.C. 154(b) by 697 days.

(21) Appl. No.: 12/809,034

(22) PCT Filed: Jun. 30, 2008

(86) PCT No.: PCT/GB2008/002262
§ 371 (c)(1), (2), (4) Date: Nov. 2, 2010

(87) PCT Pub. No.: WO2009/087340
PCT Pub. Date: Jul. 16, 2009

(65) Prior Publication Data
US 2011/0038541 A1 Feb. 17, 2011

(30) Foreign Application Priority Data
Jan. 9, 2008 (GB) .................................. 0800364.2

(51) Int. Cl.
*G06K 9/00* (2006.01)
(52) U.S. Cl.
USPC .......................................... 382/305; 382/175
(58) Field of Classification Search
USPC .................. 382/175, 190, 276, 296, 298, 305
See application file for complete search history.

(56) References Cited

U.S. PATENT DOCUMENTS

| 7,570,794 B2 * | 8/2009 | Swanger et al. ............... 382/141 |
| 2006/0050152 A1 * | 3/2006 | Rai et al. ..................... 348/218.1 |

FOREIGN PATENT DOCUMENTS

| EP | 1 912 160 A1 | 5/2012 |
| JP | 09-330414 | 12/1997 |
| JP | 2005-317020 A | 11/2005 |
| WO | WO 2009/001025 A1 | 12/2008 |
| WO | WO 2009/047471 A1 | 4/2009 |
| WO | WO 2008/084185 A1 | 10/2009 |

OTHER PUBLICATIONS

Lindeberg, Tony. "Feature detection with automatic scale selection." International journal of computer vision 30.2 (1998): 79-116.*
Srisuk, Sanun, et al. "Face authentication using the trace transform." Computer Vision and Pattern Recognition, 2003. Proceedings. 2003 IEEE Computer Society Conference on. vol. 1. IEEE, 2003.*
"Feature Detection", http://opencv.willowgarage.com/documention/c/feature_detectoion.html#findcornersubpix, pp. 1-9, Jul. 30, 2010.

(Continued)

*Primary Examiner* — Shefali Goradia
(74) *Attorney, Agent, or Firm* — Birch, Stewart, Kolasch & Birch, LLP.

(57) ABSTRACT

A method for deriving a representation of an image is described. The method involves processing signals corresponding to the image. At least one region of the image that is representative of the image is identified. In one embodiment, each identified region corresponds to a feature of the image. For each identified image region, a two dimensional function of at least part of the image region is derived and processed to obtain an intermediate representation of the at least part of the image region. A representation of the image is derived from the intermediate representation of at least one of the image regions.

32 Claims, 3 Drawing Sheets

(56) References Cited

OTHER PUBLICATIONS

Huang et al., "Palmprint verification based on principal lines", Pattern Recognition, vol. 41, 2007, pp. 1316-1328.

Jian Li, "Appearance Modeling Under Geometric Context for Object Recognition in Videos", Ph.D. Thesis, Electrical & Computer Engineering Theses and Dissertations, 2006.

Kim et al., "Object recognition using a generalized robust invariant feature and Gestalt's law of proximity and similarity", Pattern Recognition, vol. 41, 2007, pp. 726-741.

Mikolajczyk et al., "A Performance Evaluation of Local Descriptors" IEEE Transactions on Pattern Analysis and Machine Intelligence, vol. 27, No. 10, Oct. 2005, pp. 1615-1630.

Srisuk et al., "Face Authentication using the Trace Transform", Proceedings of the 2003 IEEE Computer Society Conference on Computer Vision and Pattern Recognition (CVPR'03), vol. 1, 2003, pp. 305-312.

* cited by examiner

FEATURE-BASED SIGNATURES FOR IMAGE IDENTIFICATION

BACKGROUND TO THE INVENTION

The present invention relates to a method and apparatus for representing an image, and, in addition, a method and apparatus for comparing or matching images, for example, for the purposes of searching or validation.

DESCRIPTION OF THE RELATED ART

The present invention relates to improvements upon the image identification techniques disclosed in earlier, co-pending European patent application No: EP 06255239.3, and UK patent application Nos: GB 0700468.2, GB 0712388.8 and GB 0719833.6, the contents of which are incorporated herein by reference. Details of the inventions and embodiments disclosed in these earlier, co-pending patent applications apply analogously to the present invention and embodiments.

The image identification techniques used in the methods and apparatuses described in EP 06255239.3, GB 0700468.2, GB 0712388.8 and GB 0719833.6 each extract a short binary descriptor from an image (see FIG. 2). These techniques address many drawbacks of the prior art, and, in particular, are characterised by:

reduced computational complexity for both feature extraction and matching,
  reduced image descriptor size,
  increased robustness to various image modifications, and
  reduced false alarm rate to 0.05 parts per million (ppm) level while maintaining detection rate of 99.8% for a wide range of image modifications.

These methods offer very high levels of robustness to many common image modifications. However, they may not provide the required level of robustness to a class of image modifications, where a significant part of image content is lost or replaced, such as translation and cropping.

Significantly improved robustness to a class of image modifications involving partial loss of image content is therefore desired.

SUMMARY OF THE INVENTION

In accordance with a first aspect, the present invention provides a method of deriving a representation of an image as defined in accompanying claim 1.

In accordance with a second aspect, the present invention provides a method for comparing images, for example for image matching, by comparing representations of images derived in accordance with the first aspect of the present invention.

Other aspects of the present invention include use of image representations derived in accordance with the first aspect of the present invention, an apparatus and a computer program for performing a method in accordance with the first and/or second aspect of the present invention.

The present invention concerns a new approach to representing an image based on a small number of regions of interest described by region-based Trace-transform descriptors. It also concerns a new method of image matching.

In accordance with embodiments of the present invention, a representative small set of interest or feature points are selected from an image. Constraints are used in the selection procedure such as an exclusion zone around previously selected features. A binary "feature signature" is extracted from each selected region of interest, using a modified Trace-transform based method. The feature signature is used to characterise the local neighbourhood of the feature. An image is represented by the plurality of local feature signatures and their geometric relations.

In accordance with embodiments of the present invention, an image matching procedure is performed as a two stage process that involves rapidly identifying candidate sets of matching pairs of feature points using the cumulative Hamming distance before applying geometric constraints to increase the accuracy of the method. Specifically, the information provided by the geometry of the feature points selected from the image helps to significantly reduce the false alarm rate. The geometric information may also be used to determine the class of image transformation and the transformation parameters.

Embodiments of the present invention are designed to be complementary to the image identification apparatuses and methods described by EP 06255239.3, GB 0700468.2, GB 0712388.8 and GB 0719833.6. The present invention advantageously provides additional robustness to certain image modifications. However, using state of the art processing resources, independent use of the technique of the present invention may not offer the same performance, in terms of search speed, as the techniques proposed in the above-referenced earlier, co-pending patent applications. In particular, the process of identifying potential pairs of features according to embodiments of the present invention may be at least an order of magnitude slower than the previously proposed methods. Whilst a method according to the present invention and one or more methods of the earlier co-pending patent applications could be used independently, in would be preferable to combine the methods. In this way, the results from using faster methods may then be passed for further analysis into the relatively slower method of the present invention, as described below. When applied jointly, the performance benefits in terms of the speed, false detection rates and robustness are maximised.

Other features and advantages of the invention will be apparent from the following description and accompanying claims.

BRIEF DESCRIPTION OF THE DRAWINGS

Embodiments of the invention will now be described with reference to the accompanying drawings, of which:

FIG. 1a shows an image;
FIG. 1b shows a reduced version of the image of FIG. 1a;
FIG. 1c shows a rotated version of the image of FIG. 1a;
FIG. 1d shows a blurred version of the image of FIG. 1a;
FIG. 1e shows a flipped (left-right) version of the image of FIG. 1a;
FIG. 1f shows a heavily compressed version of the image of FIG. 1a;
FIG. 1g shows a cropped version of the image of FIG. 1a.

DETAILED DESCRIPTION OF THE EMBODIMENTS

Various embodiments for deriving a representation of an image, specifically an image identifier, and for using such a representation/identifier for the purposes of, for example, identification, matching or validation of an image or images, will be described below. The present invention is especially useful for, but is not restricted to, identifying an image. In the described embodiments, an "image identifier" (also referred to simply as "identifier", "signature" or "image signature") is an example of a representation of an image and the term is used merely to denote a representation of an image, or descriptor.

The skilled person will appreciate that the specific design details of an image identification apparatus and method, according to an embodiment of the invention, and the derivation of an image identifier for use in image identification, is determined by the requirements related to the type of image modifications it should be robust to, the size of the identifier, extraction and matching complexity, target false-alarm rate, etc.

The following example illustrates a generic design that results in an identifier that is robust to the following modifications to an image (this is not an exhaustive list):
Colour reduction,
Blurring,
Brightness Change,
Flip (left-right & top-bottom),
Greyscale Conversion,
Histogram Equalisation,
JPEG Compression,
Noise,
Rotation,
Cropping,
Scaling,
Translation,
Skewing and
Perspective change.

It has been found that the proposed design may typically achieve a low false-alarm rate of less than 10 parts per million (ppm) on a broad class of images and typical detection rates above 95.0%.

Figure 1:
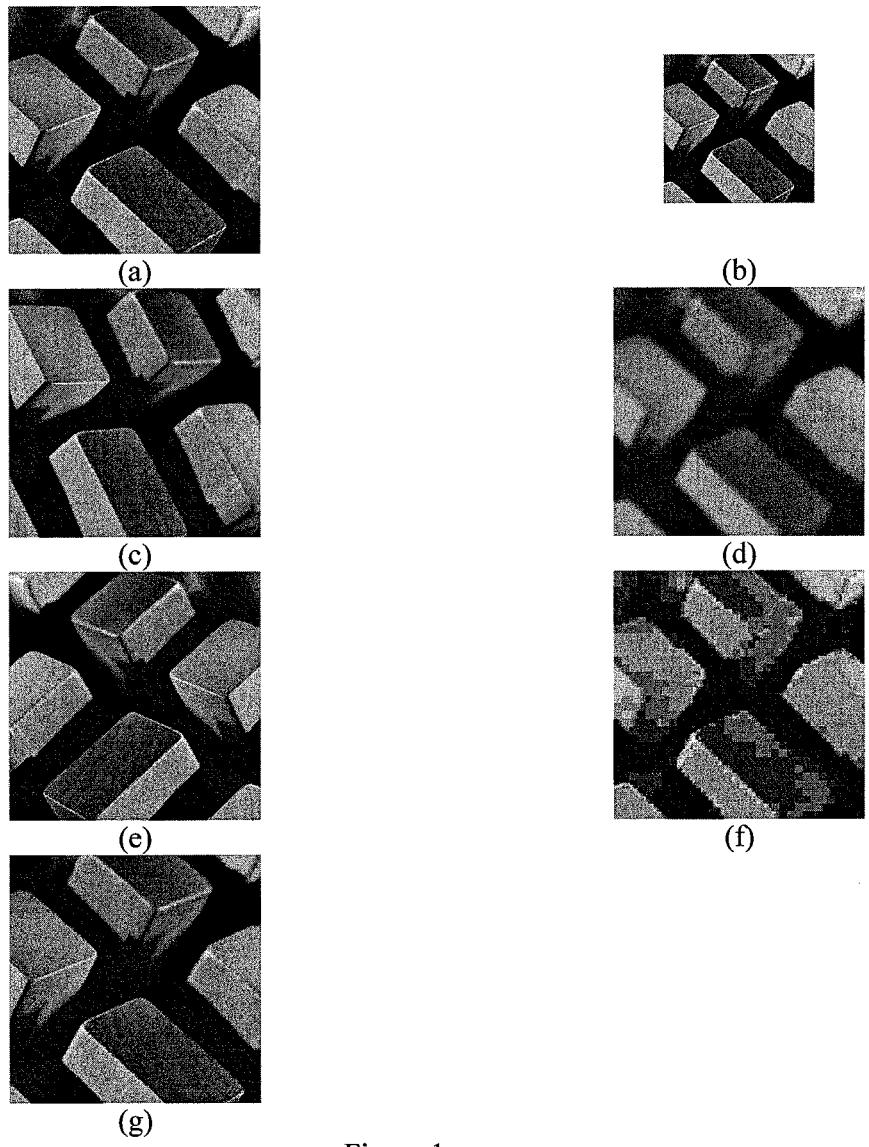

FIG. 1 shows an example of an image and modified versions of the image. More specifically, FIG. 1*a* is an original image, FIG. 1*b* is a reduced (scaled) version of the image of FIG. 1*a*, FIG. 1*c* is a rotated version of the image of FIG. 1*a*, FIG. 1*d* is a blurred version of the image of FIG. 1*a*, FIG. 1*e* is a flipped version of the image of FIG. 1*a*, FIG. 1*f* is a compressed version of the image of FIG. 1*a* and FIG. 1*g* is a cropped version of the image of FIG. 1*a*.

An embodiment of the invention derives a representation of an image, and more specifically, an image identifier, by processing signals and/or image data corresponding to the image.

Consistent with EP 06255239.3, GB 0700468.2, GB 0712388.8 and GB 0719833.6, in the initial stage of extraction of the image identifier the image is optionally pre-processed by resizing and filtering. The resizing step is used to normalise the images before processing. The filtering step can comprise of filtering to remove effects such as aliasing it can also include region selection and tapering. In one embodiment the image is resized to a resolution of 192×N or N×192, where N≤192 and preserving the aspect ratio. In another embodiment the image is resized to a square of 192×192. The image is then low pass filtered with a 3×3 Gaussian kernel. A circular region is extracted from the centre of the image for further processing. The pre-processing steps are optional and can include any combination of the above.

Figure 2:
FIG. 2 shows an image and a bit string representation of the image according to the prior art.
Figure 3:
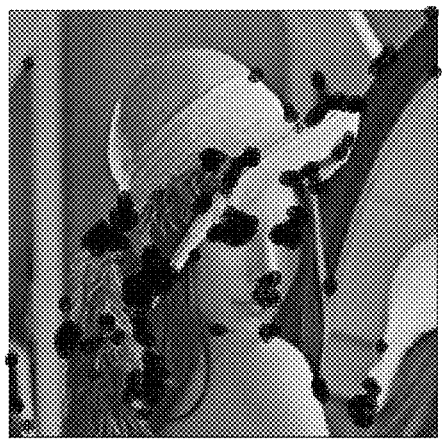
FIG. 3 shows an example set of interest points detected by a gradient-based feature detector.
Figure 4:
FIG. 4 shows the image boundary region from which no features are chosen and a final set of features based on strength.

In the next stage interest points are detected in the image. One embodiment uses a feature detector to detect potential features in an image and their strength based on measuring image gradients. One suitable image gradient feature detector is a Harris feature detector. Example results of the Harris feature detector, applied to the image of FIG. 2, are shown in FIG. 3. A selection procedure is applied to choose a representative set of features. In an embodiment, up to 16 features are chosen. A boundary is set around the edge of the image from which no features are chosen, in the embodiment the boundary is 16 pixels wide. The strongest feature from the allowable features amongst the detected features is selected first. The subsequent features are selected by order of strength with the restriction that a feature is not selected if it is within an exclusion zone around the previously selected features. In one embodiment, a circular region with a radius of 10 pixels is used as the exclusion zone. The selection process terminates once a predetermined number of representative features (e.g. in the preferred embodiment 16 pixels) has been selected or no more features remain. A set of features selected from those detected in FIG. 3 is shown in FIG. 4.

Now that the location of the feature (or interest) points has been selected, their position is preferably refined to sub-pixel resolution using for example a method such as described in OpenCV (FindCornerSubPix) Mar. 1, 2008, which can be obtained on the Internet at http://opencvlibrary.sourceforge.net/CvReference, reference [1]).

In GB 0719833.6, incorporated herein by reference, a method for extracting a binary image signature or image representation is disclosed. In an embodiment of the present invention, the method of GB 0719833.6 is applied to extract a binary "feature signature" from regions around feature points.

Thus, each feature signature is a binary representation of an image region associated with a detected feature. In one embodiment a circular image region, having a radius of 32 pixels, centred on a feature point is selected and the binary signature is computed for the image region. The circular region is preferably extracted to sub-pixel level accuracy, using cubic interpolation, for example. The extracted region is then processed to derive a corresponding image identifier, using the method according to GB 0719833.6. A brief summary of this method is provided below.

A Trace transform $T(d, \theta)$ of the image region is performed by projecting all possible lines, parameterised by d, $\theta$ over the image and applying a first functionale T over these lines. The result of the Trace transform may be decomposed to reduce its resolution in either or both of its dimensions d, $\theta$ in accordance with the method disclosed in GB 0700468.2. A second functional P may be applied to the columns of the Trace transform to give a vector of real numbers (i.e. a one dimensional function), as in the methods of EP 06255239.3 and GB 0700468.2. This second functional P is known as the diametrical functional and the resulting vector is known as the circus function.

A third functional, the circus functional, may be applied to the circus function to give a single number, although this step is not used in the preferred embodiment.

Alternatively, in accordance with the method of GB 0719833.6, a so-called "band-circus" function may be obtained, as an alternative to the circus function discussed above, which restricts the Trace transform to a subset of lines of the image, by selecting and processing values from only a part of the Trace transform.

The properties of the result can be controlled by appropriate choices of the first, second and/or third functional (Trace, diametrical and circus).

A binary identifier for the image region is extracted from the circus function (or the band-circus function) via a frequency representation. For example, a function $c(\omega)$ may be defined on the magnitude coefficients of the Fourier transform. One illustration of this function is taking the difference of neighbouring coefficients $$c(\omega)=|F(\omega)|-|F(\omega+1)|$$

A binary string can be extracted by applying a threshold to the resulting vector, such that $$b_\omega = \begin{cases} 0, & c(\omega) < S \\ 1, & c(\omega) \geq S \end{cases} \text{ for all } \omega.$$

Suitable choices for S include S=0 and S=mean(c). The binary representation of the image region is then made up of these binary string values $B=\{b_0, \ldots, b_n\}$.

In an embodiment of the present invention, since local image regions are used (as opposed to entire images as in GB 0719833.6) a number of modifications need to be made to the signature extraction technique described therein. In particular, two identifiers are extracted from the circus functions of the full Trace transform using the functionals:

$$\max(\lambda(t)), \quad (1)$$

and $$\int |\lambda(t)'| dt. \quad (2)$$

in accordance with the method disclosed in EP 06255239.3.

A further six, "multi resolution" identifiers may be extracted from circus functions obtained by decomposing (or sub-sampling) the distance (d) parameter of the Trace transform by a factor of 8, 16 and 32 and applying both (1) and (2), in accordance with the method disclosed in GB 0700468.2.

A further three functions are selected from bands in the Trace transform, in accordance with the method disclosed in GB 0712388.8, and two functions are extracted from the trace-annulus functions and one function is extracted from the trace-circular function, in accordance with the method disclosed in GB 0719833.6.

Each of these 14 component identifiers is 8 bits, giving a total of 112 bits for each feature identifier. The coordinates (in the pre-processed image) of the feature points are stored along with the identifier, as geometric information about the corresponding feature/image region. Optionally a subset of the 112 bits could be selected or derived.

The complete set of feature points may be represented in a number of ways. In the preferred embodiment the image descriptor is a bit stream containing a number of fields of information, the first field is the number of features. Then each feature is represented in the bitstream as the feature point coordinates (x and y), followed by the identifier. Optionally, rather than store the number of features, padding could be used with a flag set to represent an unused field.

As mentioned previously, the full matching procedure between the image features involves two stages.

A first step involves comparing all features from one image with all features from the second image. To perform matching between two feature signatures $B_1$ and $B_2$, both of length N, the Hamming distance is taken:

$$H(B_1,B_2)=\Sigma B_1 \otimes B_2, \quad (3)$$

where $\otimes$ is the exclusive OR (XOR) operator.

In an embodiment, the three unique pairs with the minimum Hamming distance H are found and the feature-based cumulative Hamming distance between two images is the sum of the three individual Hamming distances.

Figure 5:
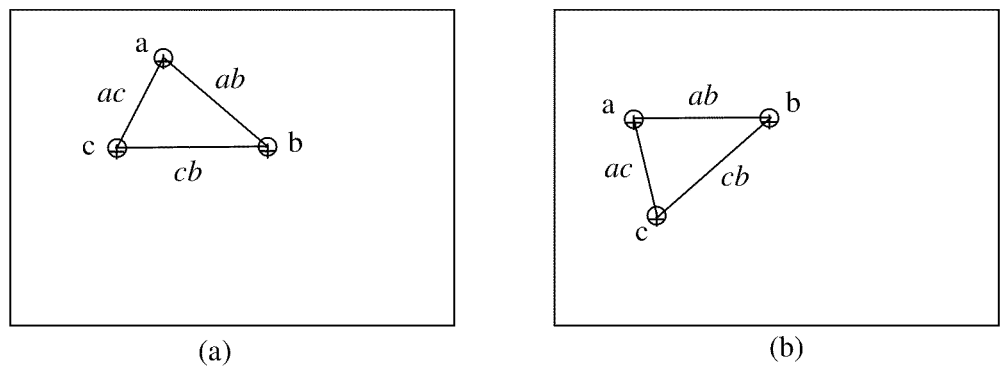
FIG. 5 shows interest points found to match using the Hamming distance from (a) an original image and (b) a rotated version of (a), in which the line lengths between the interest points are used to apply geometric constraints.

A second step involves applying a geometric constraint to determine if the images are a genuine or false match. The application of the geometric constraint is relatively computationally expensive, compared to the Hamming distance. To minimise complexity only image pairs with a cumulative Hamming distance below a predefined threshold for potential matches are compared using the geometric method. In one possible embodiment, a set of three feature points (a, b and c) are chosen. Using these three points a ratio of line lengths between the features can be used as a constraint, as shown in FIG. 5. The ratio of lines lengths is calculated by finding the Euclidean distances between the set of three feature points ab, ac and bc, using the associated coordinate information in the identifier. Two line length ratios are found $$L_1 = \frac{ab}{ac},$$

and $$L_2 = \frac{ab}{bc}.$$

Measures of distance between the line length ratios from images A and B are defined as:

$$G_1 = \frac{|L_1^A - L_1^B|}{L_1^A + L_1^B}, G_2 = \frac{|L_2^A - L_2^B|}{L_2^A + L_2^B}.$$

Advantageously, the ratio of line lengths between defined points in an image are invariant to transformations such as rotation, translation and scaling, such that the above geometric constraint is suitable for matching an image that has undergone such geometric transformations. However, other suitable geometric constraints may be used, consistent with design requirements.

In an embodiment two thresholds are applied to the distance measures, one to constrain the magnitude of the individual measures and the other to constrain the sum of the distances.

Alternatively multiple candidate sets of three feature point pairs can be preselected using a cumulative (and/or pairwise) Hamming distance constraint. The geometric constraint can then be applied to each of the (possibly ordered by for example cumulative Hamming distance) candidate sets in order until a geometric match is found or no more candidate sets remain.

The image matching technique of the present invention, as described above, may be combined with other image matching techniques, such as the method disclosed in GB 0719833.6. A descriptor is generated for each image that contains all of the individual identifiers. In the preferred embodiment the identifier bitstream contains two identifiers based on GB 0719833.6, and the descriptor for the present invention. Of the two identifiers based on GB 0719833.6 the first is generated by pre-processing the image to maintain the image aspect ratio and the other where it is processed to a square.

Preferably the matching is performed first with the faster algorithm of GB 0719833.6 at a very low false alarm threshold. Any image pairs below the threshold are considered to be a match, and pairs above the threshold (that is not considered a match by GB 0719833.6) are then processed in accordance with the present invention. Firstly, the cumulative Hamming distance is applied and sets of three pairs above the threshold are considered to be different (no match). A geometric constraint is applied for sets of three pairs below the cumulative Hamming distance threshold. If the geometric measure for the set of three pairs is below the threshold level for the geometric measure the image pair are considered to be a match; otherwise they are considered to be different.

Figure 6:
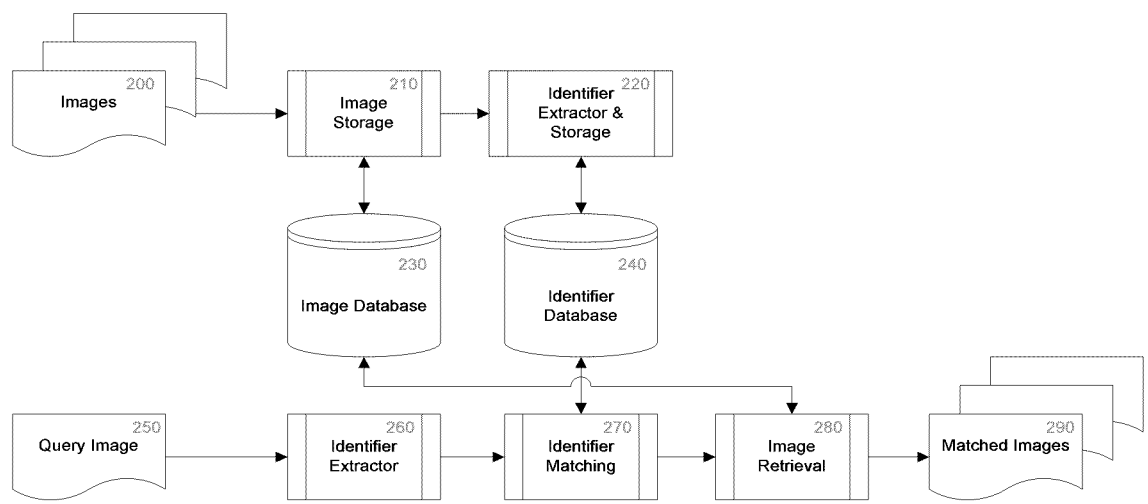
FIG. 6 is a block diagram of an apparatus according to an embodiment of the present invention.

An apparatus for implementing the present invention, according to an embodiment, for carrying the above methods is shown in FIG. 6. The implementation involves building a database of identifiers 240 for images stored in an image database 230. The two databases 230 and 240 may be the same or separated databases. The apparatus allows searching for an identifier 260 extracted from a query image 250 to find matches in the identifier database 140. A, possibly ordered, list of images is returned to the user 290 or a query application.

As the skilled person will appreciate, many variations and modification may be made to the described embodiments. For example, whilst the described embodiments identify image regions, from which the image signature is derived, based on feature detection, other techniques may be used to identify image regions that are representative of, or significant within, the image. Moreover, whilst the described embodiment uses a feature detector based on an image gradient method, many other suitable methods may be used for the detection of interest points or regions in an image. Similarly, other techniques for selecting the best or strongest detected feature or interest points are possible.

In addition, it is possible to use one or more of a variety of geometric constraints other than the distance measures relating to the ratio of lines lengths associated with a set of three feature points, used in the described embodiment. For example, any number of features points can be used in conjunction with distance measures. Alternatively, other geometric constraints may be based on angles between feature points. Moreover, an affine model may be used to define the geometric constraint.

It is intended to include all such variations, modifications and equivalents which fall within the spirit and scope of the present invention.

REFERENCES

[1] Open CV Reference Manual, Chapter 1: Image Processing Gradients, Edge and Corners—"FindCornerSubPix": http://opencvlibrary.sourceforge.net/CvReference

The invention claimed is:

1. A method of deriving a representation of an image by processing signals corresponding to the image, the method comprising:
   identifying a plurality of regions of the image, wherein each region is representative of, or significant to, the image; and
   for each identified image region:
   deriving a function of at least part of the image region; and
   using the function to obtain an intermediate representation of the at least part of the image region, and
   deriving the representation of the image from the intermediate representations of two or more of the plurality of image regions, by
   deriving a representation of each image region from the intermediate representation of the image region, and
   using a plurality of derived representations of image regions to derive the representation of the image.

2. A method as claimed in claim 1, comprising:
for each identified image region:
   deriving a function of the image region, where the function of a translated, scaled or rotated version of the image is a translated or scaled version of the function of the image region.

3. A method as claimed in claim 1, wherein the step of identifying a plurality of regions of the image comprises:
   identifying features of the image, and
   selecting image regions corresponding to identified features of the image.

4. A method as claimed in claim 3, wherein the step of selecting image regions comprises:
   selecting a plurality of said identified features of the image according to feature strength, and
   determining image regions corresponding to the selected plurality of said identified features.

5. A method as claimed in claim 3, wherein said step of selecting image regions comprises:
   selecting a plurality of image regions corresponding to identified features of the image according to their position in the image.

6. A method as claimed in claim 5, wherein the selected plurality of image regions are substantially distributed across the image.

7. A method as claimed in claim 5, wherein each selected image region corresponds to a feature that is separated from the features of other selected image regions by at least a predetermined distance in the image.

8. A method as claimed in claim 3, wherein said step of identifying features of the image uses an intensity image gradient method for detecting features.

9. A method as claimed in claim 1, wherein:
   the step of deriving a function of at least part of the image region comprises applying a first functional along lines over the image region;
   the method further comprising:
   applying a second functional to the derived function to obtain an intermediate representation of the at least part of the image region.

10. A method as claimed in claim 1, wherein the intermediate representation is a one dimensional function.

11. A method as claimed in claim 1, wherein the step of deriving a representation of each image region from the intermediate representation of the image region comprises:
   processing the intermediate representation of the at least part of the image region using a plurality of frequency components of a frequency representation of the intermediate representation.

12. A method as claimed in claim 1, wherein the step of deriving the representation of the image comprises:
   combining selected parts of representations of a selected plurality of identified image regions derived from their corresponding intermediate representations.

13. A method as claimed in claim 1, wherein the step of deriving the representation of the image from the intermediate representations of two or more of the plurality of image regions uses the intermediate representations of a predetermined number of image regions, wherein said predetermined number is preferably in the range of 2 to 256.

14. A method as claimed in claim 1, further comprising:
associating geometric information relating to each image region with derived representations of the identified image regions.

15. A method for identifying an image, comprising:
deriving a representation of the image using the method of claim 1, and
associating the representation with the image.

16. A method for comparing images comprising,
deriving a representation of each image by:
identifying a plurality of regions of the image, wherein each region is representative of, or significant to, the image;
for each identified image region:
deriving a function of at least part of the image region; and
using the function to obtain an intermediate representation of the at least part of the image region, and
deriving a representation of the image from the intermediate representations of two or more of the plurality of image regions, by deriving a representation of each image region from the intermediate representation of the image region, and using a plurality of derived representations of image regions to derive the representation of the image; and
comparing the derived representations.

17. A method for comparing images as claimed in claim 16, comprising:
comparing image regions associated with the representation of a first image with image regions associated with the representation of a second image.

18. A method as claimed in claim 17, comprising
using the representations of first and second images to determine a Hamming distance between a representation of an image region of the first image and a representation of an image region of the second image, and
identifying the first and second images as a potential match, if the Hamming distance between the representations of the corresponding image regions is below a first predetermined threshold.

19. A method as claimed in claim 18, comprising determining a Hamming distance for representations of a plurality of image regions of the first and second images.

20. A method as claimed in claim 19, further comprising:
identifying a predetermined number of pairs of image regions from the first and second images, the identified pairs having corresponding representations with a lowest determined Hamming distance which is below the first predetermined threshold.

21. A method as claimed in claim 20, wherein each region in the identified pairs of image regions is unique.

22. A method as claimed in claim 19, further comprising:
determining a cumulative Hamming distance using the sum of the Hamming distances for the representations of identified pairs of image regions, and
identifying the first and second images as a potential match, if the cumulative Hamming distance of the representations of identified pairs of image regions is below a second predetermined threshold.

23. A method as claimed in claim 18, comprising:
applying a geometric constraint to geometric information for a plurality of pairs of image regions of pairs or images determined to be a possible match, to determine if the images are a match.

24. A method as claimed in claim 23, wherein the step of applying a geometric constraint comprises:
determining a first ratio of distances between a predefined number of image regions in the first image;
determining a second ratio of distances between the predefined number of image regions in the second image; and
determining the first and second images as a match if a difference between the first and second ratios is below a third predetermined threshold.

25. A method as claimed in claim 24, wherein the predefined number is three.

26. A method as claimed in claim 25, wherein the step of applying a geometric constraint comprises:
for each of the first and second images:
calculating ratios of Euclidean distances between points (a, b, c) corresponding to the three image regions using the equations:

$$L_1 = \frac{ab}{ac}, \text{ and } L_2 = \frac{ab}{bc},$$

and
measuring a distance between the line length ratios ($L_1$, $L_2$) of the first and second images (A, B) using the equations:

$$G_1 = \frac{|L_1^A - L_1^B|}{L_1^A + L_1^B}, G_2 = \frac{|L_2^A - L_2^B|}{L_2^A + L_2^B}.$$

27. A method as claimed in claim 26, wherein the third threshold includes a threshold for one or more of $G_1$, $G_2$, and $G_1+G_2$.

28. A method as claimed in claim 16, comprising selecting matching images from the plurality of images based on a comparison of representations.

29. An apparatus for deriving a representation of an image by processing signals corresponding to the image or comparing images, the apparatus comprising:
at least one database storing a plurality images or representations of images: and
one or more processors adapted to execute the method of claim 1 or claim 16.

30. Apparatus as claimed in claim 29, further comprising:
a control device for controlling operation of the device one or more processors adapted to carry out the method of claim 1 or claim 16.

31. Apparatus as claimed in claim 29, further comprising:
a display means, and
an image selecting means.

32. A computer storage medium comprising instructions that, when executed by a computer, perform the method as claimed in claim 1 or claim 16.

* * * * *